United States Patent
Bayat et al.

(10) Patent No.: US 12,417,440 B2
(45) Date of Patent: Sep. 16, 2025

(54) SYSTEM AND METHOD FOR ACCESSING AND UPDATING DEVICE SAFETY DATA BY BOTH OWNERS AND NON-OWNERS OF DEVICES

(71) Applicant: Bauer Compressors, Inc., Norfolk, VA (US)

(72) Inventors: Anthony B. Bayat, Virginia Beach, VA (US); Neil S. Patel, Virginia Beach, VA (US); Eshwar Krishna Chigurupati, Norfolk, VA (US)

(73) Assignee: BAUER COMPRESSORS, INC., Norfolk, VA (US)

( * ) Notice: Subject to any disclaimer, the term of this patent is extended or adjusted under 35 U.S.C. 154(b) by 385 days.

(21) Appl. No.: 18/146,395

(22) Filed: Dec. 26, 2022

(65) Prior Publication Data

US 2023/0129278 A1    Apr. 27, 2023

Related U.S. Application Data

(63) Continuation-in-part of application No. 17/154,408, filed on Jan. 21, 2021, now abandoned.

(51) Int. Cl.
| | |
|---|---|
| *G06Q 10/20* | (2023.01) |
| *G06F 21/44* | (2013.01) |
| *G06Q 30/018* | (2023.01) |

(52) U.S. Cl.
CPC .............. *G06Q 10/20* (2013.01); *G06F 21/44* (2013.01); *G06Q 30/0185* (2013.01)

(58) Field of Classification Search
CPC ..... G06Q 10/20; G06Q 30/0185; G06F 21/44
See application file for complete search history.

(56) References Cited

U.S. PATENT DOCUMENTS 5,764,536 A * 6/1998 Yamamoto ............ G06T 7/0006
382/148
6,393,802 B1 * 5/2002 Bowser ................... F17C 5/002
53/403

(Continued)

FOREIGN PATENT DOCUMENTS

| CN | 112785171 A | * | 5/2021 | ............. G06Q 50/26 |
| CN | 114841557 A | * | 8/2022 | ............. G06Q 50/04 |

(Continued)

OTHER PUBLICATIONS

World Liquid Gas (WLGA) "Guide to Good Industry Practices LPG Cylinder Filling", Jul. 26, 2017, https://www.worldliquidgas.org/publication/guide-good-industry-practices-lpg-cylinder-filling/ (Year: 2017).*

(Continued)

*Primary Examiner* — Gerardo Araque, Jr.
(74) *Attorney, Agent, or Firm* — Peter J. Van Bergen (57) ABSTRACT

Records remotely stored for organizations include first data matching device identification data coupled to a device and safety-critical data for the device. The records are accessed by a mobile device operated by a user authorized by one of the organizations. An offline database is constructed on the mobile device using only records for the one organization. The mobile device is used to obtain device identification data from a particular device. It is determined if a first match exists between the device identification data and the remotely-stored first data, or if a second match exists between the device identification data and the first data in the offline database. Updates to the safety-critical data for the device are obtained via the mobile device when one of the first match and second match exists, and are stored in the remotely-stored record associated therewith.

22 Claims, 9 Drawing Sheets

(56) References Cited

U.S. PATENT DOCUMENTS

| | | | |
|---|---|---|---|
| 9,582,837 B2* | 2/2017 | Wada | G07C 9/27 |
| 2006/0283517 A1* | 12/2006 | McCulloh | F17C 5/06 |
| | | | 141/2 |
| 2007/0008152 A1* | 1/2007 | Parias | F17C 13/003 |
| | | | 340/573.1 |
| 2008/0084291 A1* | 4/2008 | Campion | G08B 29/145 |
| | | | 340/514 |
| 2010/0065146 A1* | 3/2010 | Plummer | F17C 13/003 |
| | | | 141/2 |
| 2016/0125342 A1* | 5/2016 | Miller | G06Q 50/40 |
| | | | 705/7.26 |
| 2017/0061961 A1* | 3/2017 | Nichols | G10L 15/26 |
| 2017/0116669 A1* | 4/2017 | Wickstrom | G06Q 40/03 |
| 2019/0066033 A1* | 2/2019 | Mains, Jr. | G06Q 10/06311 |

FOREIGN PATENT DOCUMENTS

| | | | | |
|---|---|---|---|---|
| EP | 3016046 A1 * | 5/2016 | | G06F 3/167 |
| EP | 3136382 A1 * | 3/2017 | | G06F 3/167 |
| JP | 2004234554 A * | 8/2004 | | |
| JP | 2006123917 A * | 5/2006 | | B65D 55/0854 |
| WO | WO-2019046771 A1 * | 3/2019 | | G06Q 10/06311 |
| WO | WO-2019112844 A1 * | 6/2019 | | G06F 16/24573 |
| WO | WO-2022147600 A1 * | 7/2022 | | G06Q 50/16 |

OTHER PUBLICATIONS

Appiontools "How to Add a Refrigerant Filled Multi-Use Cylinder to the Tank Manager on Android", Aug. 11, 2022, The Wayback Machine—https://web.archive.org/web/20220811084402/https://appiontools.com/how-to-add-filled-multi-use-cylinder-to-tank-manager-andro . . . (Year: 2022).*

K. Kanev, Z. Cheng and N. Mirenkov, "Methods and Technologies for Enhancing and Optimizing Power Plant Inspection Procedures," 7th IEEE International Conference on Computer and Information Technology (CIT 2007), Aizu-Wakamatsu, Japan, 2007, pp. 605-609, doi: 10.1109/CIT.2007.42 (Year: 2007).*

R. Behrens et al., "Knowledge-based mobile remote engineering for maintenance processes," Proceedings of 2012 IEEE 17th International Conference on Emerging Technologies & Factory Automation (ETFA 2012), Krakow, Poland, 2012, pp. 1-7, doi: 10.1109/ETFA.2012.6489658 (Year: 2012).*

S. Utzig, R. Kaps, S. M. Azeem and A. Gerndt, "Augmented Reality for Remote Collaboration in Aircraft Maintenance Tasks," 2019 IEEE Aerospace Conference, Big Sky, MT, USA, 2019, pp. 1-10, doi: 10.1109/AERO.2019.8742228 (Year: 2019).*

* cited by examiner

SYSTEM AND METHOD FOR ACCESSING AND UPDATING DEVICE SAFETY DATA BY BOTH OWNERS AND NON-OWNERS OF DEVICES

This is a continuation-in-part application of co-pending application Ser. No. 17/154,408, "MOBILE DEVICE AND SYSTEM FOR MANAGING SAFETY OF GAS CYLINDER FILL OPERATIONS", filed on Jan. 21, 2021.

FIELD OF THE INVENTION

The invention relates generally to devices such as compressed gas cylinders, and more particularly to a system and method for accessing and maintaining device safety data by both owners and non-owners of devices in order to assure safety aspects associated with the operation of the devices and updates to the devices' historical safety data for the devices regardless of who uses the devices or provides the maintenance in support of continued use of the devices.

BACKGROUND OF THE INVENTION

A variety of industries and applications utilize re-fillable cylinders for the containment and dispensing of a compressed gas. For example, compressed gas in the form of breathing air is used with a self-contained breathing apparatus (SCBA) in atmospheric environments or a self-contained underwater breathing apparatus (SCUBA) in underwater environments. As is known in the art, SCBA and SCUBA are general terms used to refer to a variety of devices worn by rescue workers, firefighters, underwater divers, and others for the purpose of supplying breathing air to an individual who is operating in an environment that presents an immediately dangerous or unhealthy breathing environment. An SCBA or SCUBA includes a refillable tank or cylinder that is filled/re-filled with compressed breathing air.

The re-filling of an SCBA or SCUBA cylinder (also referred to herein as "gas cylinder" or simply "cylinder") can occur at a cylinder owner's facility (e.g., firehouse or station) where the cylinder's maintenance and re-filling is carried out by the cylinder owner's personnel. However, it is also common for a cylinder to be re-filled by a user of the cylinder that is not the owner thereof while the cylinder is being used in a field of operation. In such cases, re-filling can be carried out using a variety of types of breathing-air filling systems. For example, when multiple organizations (each of which may own their own cylinders) are called to an emergency scene, it is very common for a cylinder to be re-filled on-site by a non-owner of the cylinder using equipment not used or owned by the owner of the cylinder. Currently, when a non-owner re-fill of a cylinder occurs, the updating of historical re-fill data and safety data associated with a cylinder typically does not occur thereby causing re-fill and safety information about that cylinder to be incomplete.

To protect the health and safety of users of cylinders as well as those re-filling cylinders, numerous governmental regulations and reporting requirements have been promulgated and must be adhered to by owners, users, and fillers (i.e., owner and non-owner fillers) of cylinders. Unfortunately, the wide variety of cylinders, filling systems, filling locations/stations, and likelihood of a non-owner filling scenario, can make it difficult or impossible to manage and satisfy the regulations, reporting requirements, and fill and safety data updates associated with gas cylinder filling operations. Furthermore, combining the above-noted variables with human error can lead to improper filling of a cylinder that presents a safety concern for filling personnel and/or a user of an improperly filled cylinder.

SUMMARY OF THE INVENTION

Accordingly, it is an object of the present invention to provide a system and method for accessing and maintaining device safety data by both owners and non-owners of devices.

Another object of the present invention is to provide a system and method for accessing and updating safety data associated with compressed gas cylinders by both owners and non-owners of the cylinders during a re-filling operation regardless of where the filling operation takes place and regardless of who performs the filling operation.

Other objects and advantages of the present invention will become more obvious hereinafter in the specification and drawings.

In accordance with the present invention, a method stores information for a plurality of organizations in a network-based non-transitory storage media. The information is arranged in standardized-format records. Each record from the standardized-format records (i) is associated with a device, (ii) is uniquely identified in the storage media, (iii) has first data matching device identification data coupled to the device, (iv) has second data indicating an owner of the device, and (v) has safety-critical data for the device. Remote access is provided to the storage media by a mobile device operated by a user authorized by one of the organizations. When the storage media is accessible by the mobile device, an offline database is automatically constructed on the mobile device using only the standardized-format records for the one organization. The user, via the mobile device, obtains the device identification data from a device being evaluated by the user. At the storage media, it is determined if a first match exists between the device identification data for device being evaluated and the first data in the storage media when the storage media is accessible. At the mobile device, it is determined if a second match exists between the device identification data for the device being evaluated and the first data in the offline database when the storage media is inaccessible. Updates to the safety-critical data for the device being evaluated are obtained from the user via the mobile device when one of the first match and second match exists. The updates are stored in the storage media for the device being evaluated when the storage media is accessible.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
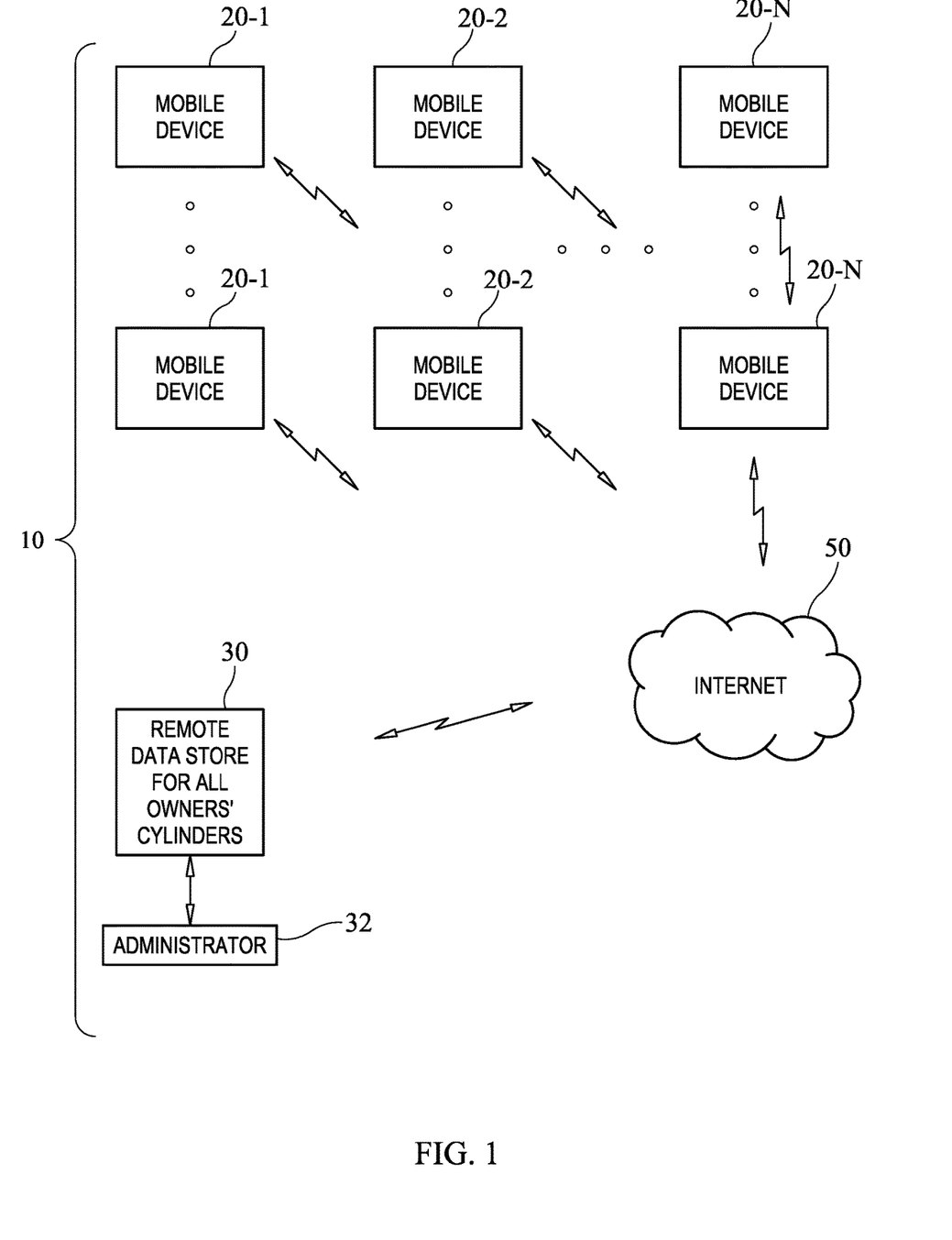
FIG. 1 is a block diagram of a system for accessing and updating device safety data by both owners and non-owners of devices in accordance with an embodiment of the present invention.

Referring now to the drawings and more particularly to FIG. 1, a system that provides for the access to and update of device safety data by both owners and non-owners of such devices is shown and is referenced generally by numeral 10. While the type of device is not a limitation of the present invention, the following description will assume that the devices are gas cylinders. More specifically, the gas cylinders of concern are designed to contain and be re-fillable with a compressed gas that can be breathing air, pure oxygen, or any other gas without departing from the scope of the present invention.

System 10 includes a plurality of mobile electronic devices 20-1, 20-2, . . . , 20-N (hereinafter "mobile devices"), and a remotely-located data store 30 (e.g., a remotely-located database facility providing what is known as cloud-based data storage accessible by authorized users of the mobile devices over a global computer network) that is controlled/maintained by an administrator 32 unrelated to the various owners of gas cylinders utilizing system 10. Administrator 32 can include at least some autonomous functionality as will be described later herein. In the illustrated example, the mobile devices are owned by or authorized for use by N different gas cylinder owners utilizing system 10. That is, mobile devices 20-1 are owned or authorized for use by a first gas cylinder owner (e.g., a locale's fire department); mobile devices 20-2 are owned or authorized for use by a second gas cylinder owner (e.g., a hospital); etc. The mobile devices can include dedicated hardware units or existing smartphones, tablets, etc., configured to implement the present invention.

In general, data store 30 represents a non-transitory data storage media storing all operational life information (e.g., ownership data, safety data, fill data, historical reports, etc.) associated with all cylinders owned by all N owners. The N owners are generally diverse and separate organizations or entities that can operate in a variety of geographic regions. Such owners can be, for example, fire departments, police departments, hospitals or hospital systems, state or federal entities, private contractors, or other organizations.

The present invention provides a standardized database record structure maintained at data store 30 that supports the reality that a particular owner's gas cylinders (e.g., a locale's police department) can frequently be used by and/or re-filled by another user or owner of gas cylinders (e.g., a fire department from the same or different locale as the police department). This scenario is not at all uncommon in emergency situations (e.g., building fires, wild fires, shootings, natural disasters, etc.) when multiple organizations or entities, each of which may have its own gas cylinders, converge to address the emergency. These intense and often chaotic situations do not lend themselves to existing conventional systems used to access or update gas cylinder fill and safety/historical data required for safe re-filling operations and subsequent safe use of a re-filled cylinder. Such existing conventional systems include paper documentation maintained by an organization/entity and/or a gas cylinder owner's internal database maintained at their office but accessible only by their own personnel. However, during chaotic emergency situations involving multiple organizations, there is generally no ability or time to check paper records and/or no way to contact a gas cylinder owner's office to access cylinder status and or critical re-filling data. As a result, when a gas cylinder owned by one organization is re-filled by either an owner-authorized fill operator who cannot access their organization's records or by a fill operator not affiliated with the owner of the gas cylinder, a cylinder's re-filling operation is often carried out using a patchwork of a re-filling operator's experience, guesswork, and hunches thereby presenting the potential for compromising the safety of filling operations as well as users of a re-filled gas cylinder. In addition, when this occurs, updates to a cylinder's historical re-fill and safety data records are generally omitted. The resulting incomplete historical record for a cylinder compromises a cylinder owner's ability to track the operational life of that cylinder.

The present invention's database record structure at data store 30 and unique processing provided by system 10 eliminates the above-described re-fill and safety data update omissions to provide owners and users of gas cylinders with a high-level of confidence that a gas cylinder can be safely re-filled, that a gas cylinder is re-filled to its proper specifications, that a re-filled gas cylinder can be safely used, and that re-fill and safety data records are updated and current. In addition, the present invention achieves this result in a way that improves the efficiency and speed of safe re-filling operations thereby eliminating time delays at critical operational times encountered during emergency situations.

Figure 2:
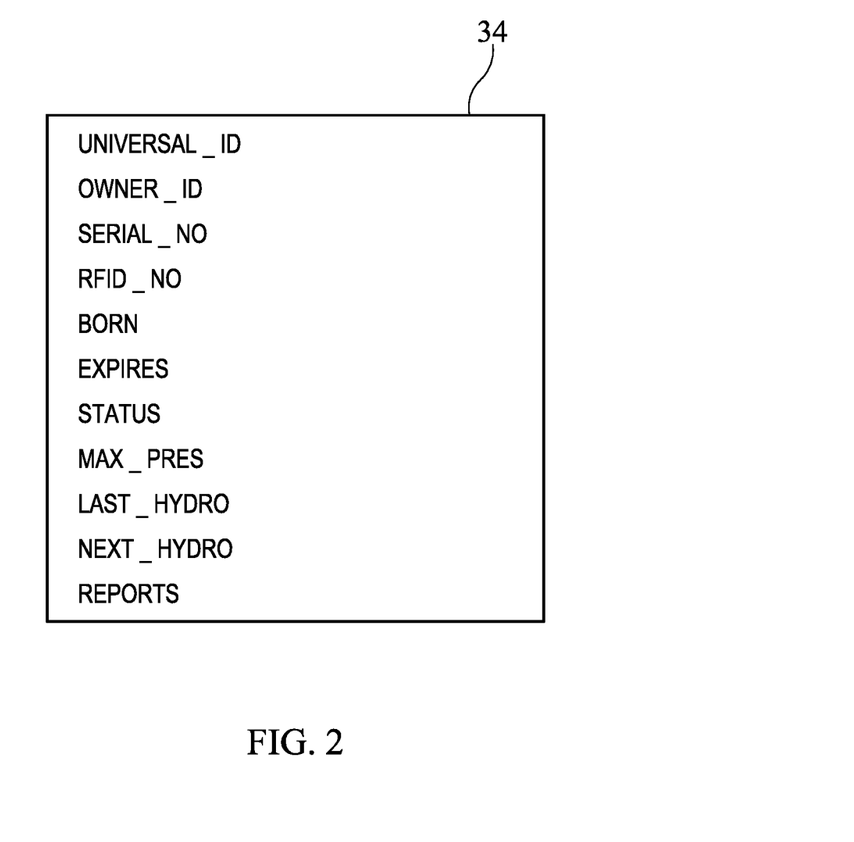
FIG. 2 illustrates a data structure for a device such as a compressed gas cylinder used in an embodiment of the present invention.

The structure of each record in the database maintained at data store 30 is identical for all N owners of gas cylinders. An exemplary data record structure 34 for each gas cylinder whose records are to be maintained at data store 30 is illustrated in FIG. 2. Each data record structure 34 is associated with a unique gas cylinder and provides the relevant operational life information for that cylinder. Each data record structure 34 is identified by a unique number, alphabetic sequence, alpha-numeric character string, etc., in a UNIVERSAL_ID field that can only be assigned by administrator 32 of data store 30. As mentioned above, administrator 32 can be a programmed controller configured to create and assign a unique, non-duplicated identifier to each gas cylinder. For example, administrator 32 can implement an auto-incrementing integer function that adds a pre-set integer (e.g., 1, 2, etc.) to the previously-created numeric identifier when registration of a cylinder is requested as will be explained later below. Other unique identifier schemes can be used without departing from the scope of the present invention. Regardless of the nature of the identifier used for UNIVERSAL_ID, the identifier remains unchanged for the life of the cylinder even if the cylinder's ownership changes (e.g., cylinder is sold or exchanged between owners, multiple owners merge into a new organization, etc.).

In addition to its UNIVERSAL_ID, each cylinder's data record structure 34 also includes the following fields:

OWNER identifying the owner of the particular cylinder;

OWNER_CYLINDER_ID identifying the owner's internal identifying information for the cylinder;

SERIAL_NO identifying a cylinder manufacturer's serial number of the cylinder assigned thereto at the time of the cylinder's manufacture;

RFID_NO identifying the unique identity of an RFID tag affixed to the cylinder;

BORN identifying the date the cylinder was manufactured;

EXPIRES identifying the end-of-life date of the cylinder;

STATUS identifying the most recently stored state of the cylinder, e.g., active, expired, damaged, etc.;

MAX_PRES identifying the maximum fill pressure of the cylinder;

LAST_HYDRO identifying the date of the most recently passed hydro test;

NEXT_HYDRO identifying the date the next hydro test should be performed on the cylinder; and REPORTS identifying one or more reports that are available concerning the cylinder, e.g., repair reports, transfer reports, inspection reports, etc.

Regardless of their owner, each of mobile devices 20-1, . . . , 20-N is identically configured to implement the present invention as will be described later below. Accordingly, it is sufficient herein to describe the operation of a single mobile device referenced to hereinafter simply as "device 20". As will be explained further below, both device 20 and data store 30 are capable of communication with one another via the internet 50. Such communication facilitates data transfer between device 20 and data store 30, and can be carried out in a wireless fashion as would be well understood in the art.

Figure 3:
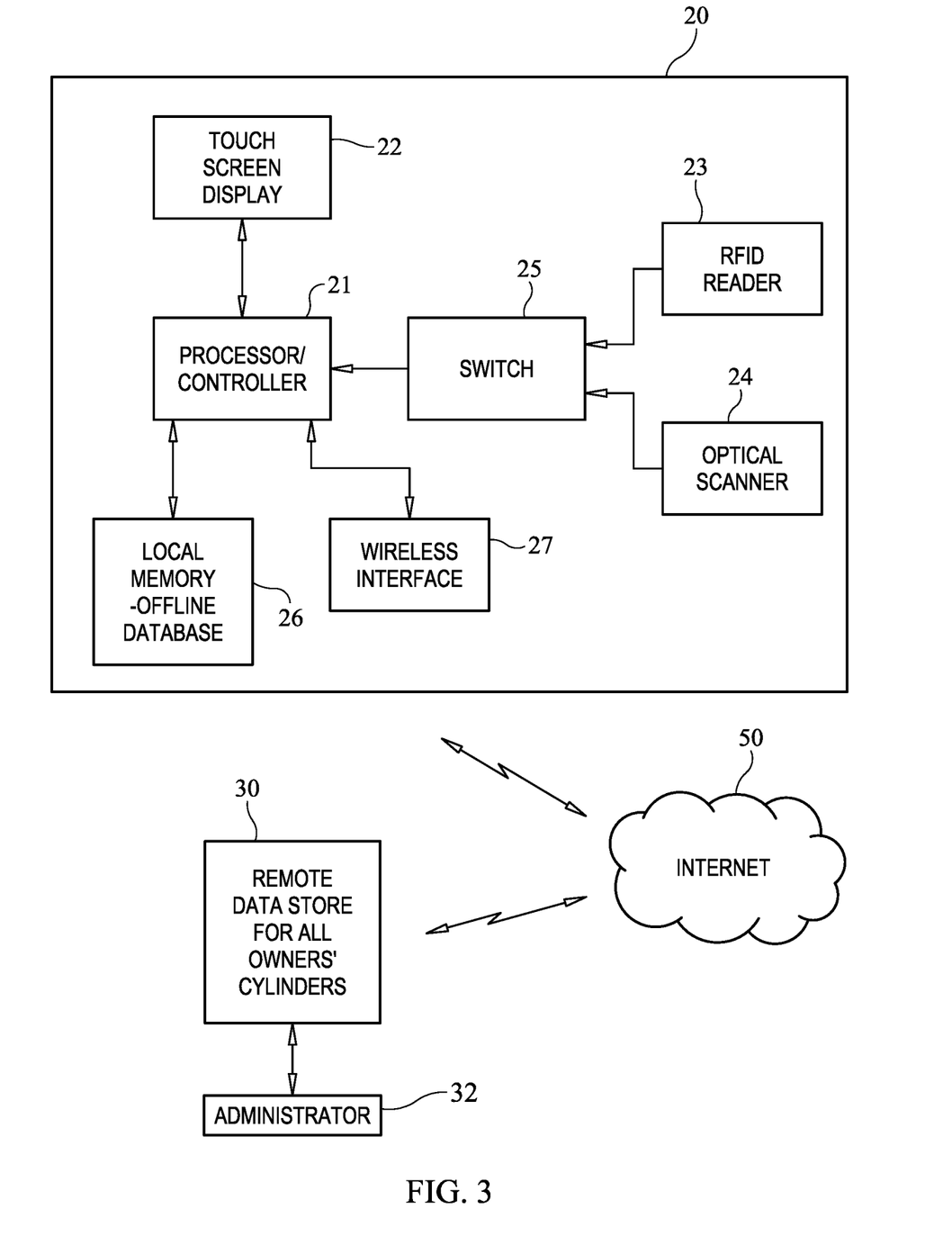
FIG. 3 is a block diagram of a single mobile device used to access and update compressed-gas-cylinder safety data where the mobile device can be owned or authorized for use by both either the cylinder's owner or a non-owner of the cylinder in accordance with an embodiment of the present invention.

Device 20 can be a self-contained hand-held device thereby making it readily available for use by a cylinder filling operator utilizing any compressed gas filling apparatus at any filling location. Device 20 can comprise a dedicated or multi-purpose portable electronic device having the attributes that will be described herein. In general, device 20 is a portable or mobile electronic device configured to build or construct an offline database on device 20 using portions of each data record structure 34 for all the cylinders owned by the particular owner (i.e., identified by the same identifier in the OWNER field) that also owns or authorized use of device 20, provide a filling operator the means to recognize or register a compressed gas cylinder, require the user of device 20 to verify and attest to critical safety criteria (e.g., criteria specified by one or more gas cylinder regulating entities, criteria specified by the owners of the gas cylinders to be filled, criteria specified by the owner of device 20, etc.), prompt the user of device 20 (e.g., the cylinder filling operator) to enter specific gas cylinder fill data if the critical safety criteria is verified and attested to by the user of device 20, and automatically update the remotely-located data store 30 with user-supplied responses to include user-supplied fill data regardless of who owns a registered cylinder.

The prompts related to critical safety criteria will generally identify a variety of inspection criteria that must be verified and attested to by a cylinder fill operator in order for a gas cylinder owner (e.g., a fire department) to be in compliance with guidelines and/or requirements. The inspection criteria can be established by one or more relevant regulating entities such as the National Fire Protection Association (NFPA) and/or the Occupational Safety and Health Administration (OSHA), as well as any in-house guidelines/requirements specified by the owner of the gas cylinder and/or the owner of the mobile device described herein.

In the illustrated embodiment, device 20 has a number of hardware components to include a processor or controller 21, a touch screen display 22 presenting the user with a graphical user interface, a "radio frequency identification" (RFID) reader 23, an optical scanner 24, a switch 25 for selecting one of multiple data-reading input devices (e.g., an RFID reader 23 or optical scanner 24), a local data-storing memory 26 where an offline database is built/stored/updated as will be described further below, and a wireless interface 27 (e.g., one or more hardware components configurable to support one or more of Bluetooth, near-field communication, cellular, and/or WIFI protocols). Device 20 could also have a single reading component (e.g., RFID reader 23 or optical scanner 24) without departing from the scope of the present invention. Although not shown, device 20 will also typically include a housing, a power source (e.g., battery(ies), a port for the coupling of an external AC power source, etc.), and/or additional supporting electrical and mechanical features whose choice and inclusion in device 20 as would be well understood in the art.

Processor 21 is representative of one or more processors, or functionally equivalent hardware or software components, that can perform one or more of the functions to be described herein. Local memory 26 is operatively coupled to processor 21 and is representative of one or more non-transitory memories that can be used for the construction and storage of an offline database built using portions of data maintained at data store 30. Local memory 26 can also function as a non-transitory computer-readable storage medium that stores computer-executable instructions that govern operations of device 20 in accordance with the methods described herein. Processor 21 could also include its own integrated memory for storing the computer-executable instructions without departing from the scope of the present invention.

Figure 4:
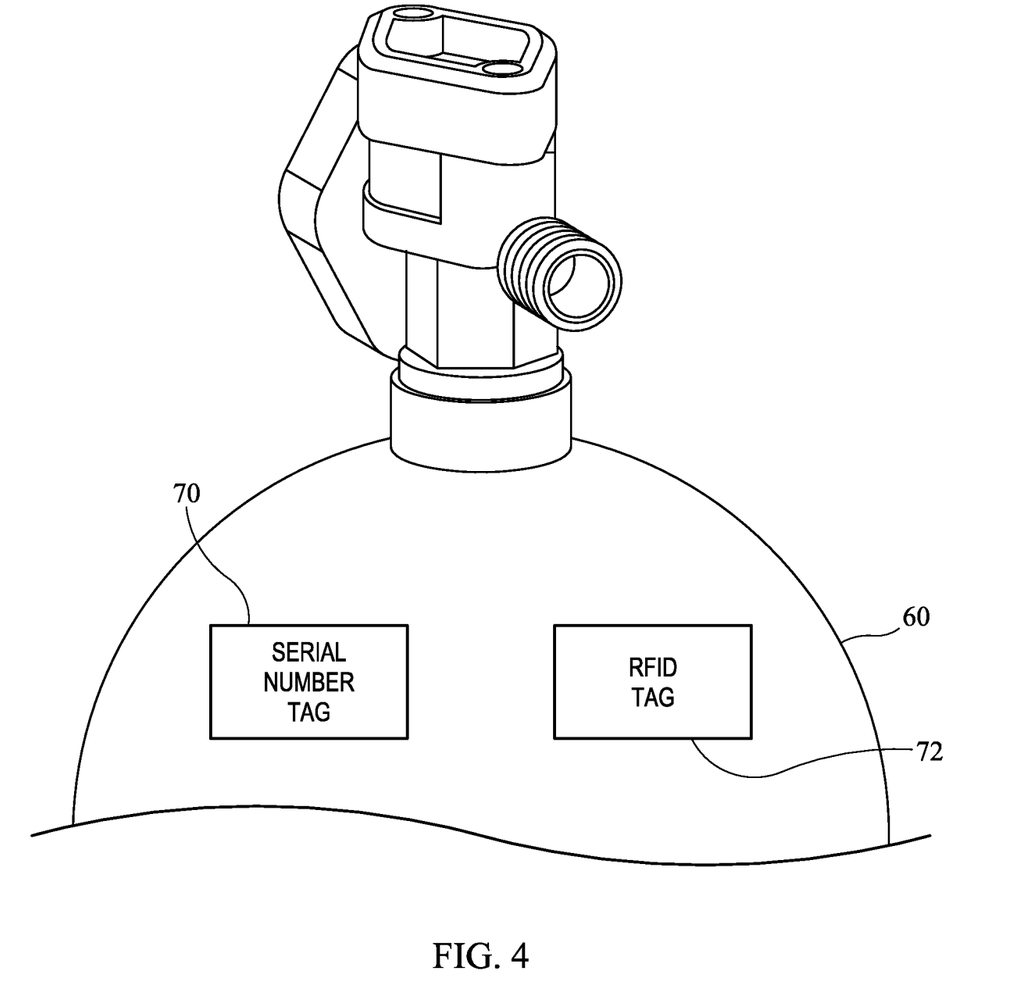
FIG. 4 is a side view of a portion of a compressed gas cylinder having identifying tag(s) coupled thereto.

Device 20 will be used by a filling operator prior to the filling of a gas cylinder with compressed gas. A portion of a typical compressed gas tank or cylinder 60 is illustrated in FIG. 4. As is known in the art, compressed gas cylinders typically have one or more identifying labels, markings, and/or tags coupled or affixed thereto that uniquely identifies the particular gas cylinder. At a minimum, every compressed gas cylinder has a serial number tag 70 affixed somewhere thereon at the time of its manufacture. Tag 70 can include alphanumeric characters, a bar code, a QR code, or any other "code" that can be read by an optical reader to indicate the cylinder's serial number. Once placed in use, many gas cylinders have an RFID tag 72 affixed to, coupled to, or integrated with cylinder 60. At a minimum, RFID tag 72 has a unique identifier stored thereon that is associated with the particular gas cylinder serial number specified on tag 70. As will be explained further below, this association is maintained in data store 30. In some embodiments and as disclosed in U.S. Pat. No. 10,867,729, the RFID tag associated with a gas cylinder can advantageously store only the tag's unique identifier with all relevant data concerning the gas cylinder being stored in, accessed from, and updated in, a remotely-located database such as data store 30.

Figure 5:
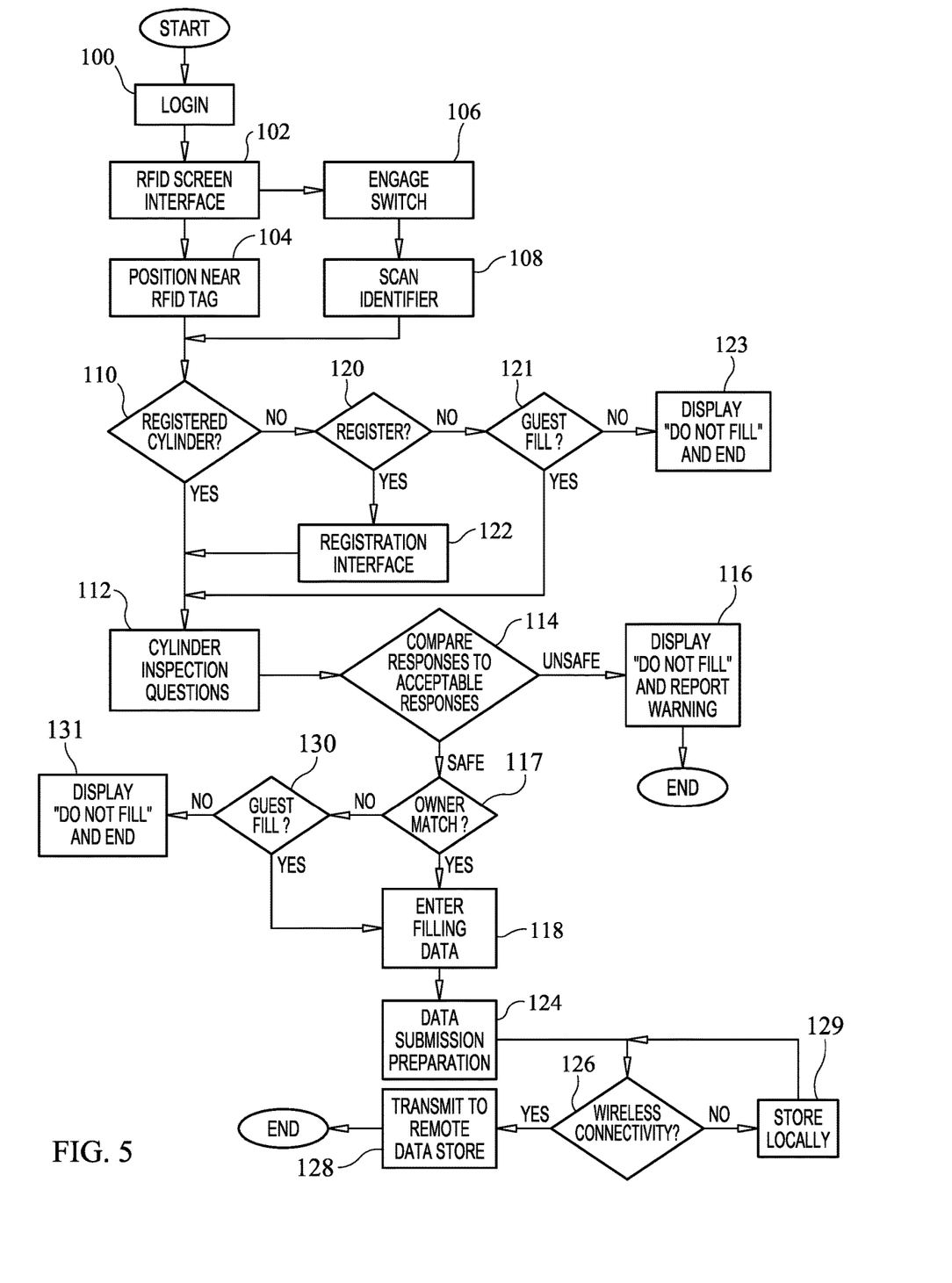
FIG. 5 is a flow diagram of a method in accordance with an embodiment of the present.

Referring additionally now to FIG. 5, an embodiment of a processing flow executed by device 20 during the use thereof is shown. The processing methodology is generally incorporated into computer-executable instructions stored on device 20 and executed by processor 21. At the start of processing, a user enters login credentials at step 100 using a graphical user interface presented on touch screen display 22. Following a properly validated login event, step 102 causes display 22 to present a screen/interface that assumes that the gas cylinder that is to be filled has an RFID tag (not shown) coupled thereto. Such login processing and validation operations are well understood in the art.

Assuming the gas cylinder to be filled has an RFID tag coupled thereto, a fill operator (or "user" as they will be referred to hereinafter) is instructed at step 104 to position device 20 close to the RFID tag whereby RFID reader 23 can read the RFID tag's identifier. Such instruction can come via a visual cue presented on display 22 and/or using an audible or tactile cue. Switch 25 can be set to a default position that selects RFID reader 23 as the data-reading input device of device 20 since many gas cylinders have RFID tags affixed or coupled thereto.

If the gas cylinder to be filled does not have an RFID tag associated therewith, it will still have a serial number tag 70 (illustrated in FIG. 4) affixed thereto. As mentioned above, any alternative identification tag capable of being read by optical scanner 24 is acceptable. When this scenario is presented to the user, switch 25 is engaged at step 106 to select optical scanner 24 as the data-reading input device for device 20. Switch 25 can be any of a variety of user-controlled switch devices (e.g., toggle switch, shake-activated switch, etc.) without departing from the scope of the present invention. Once optical scanner 24 is selected, the user is instructed at step 108 to position device 20 to scan the identification tag. Such instruction can come via a visual cue presented on display 22 and/or using an audible or tactile cue.

The gas cylinder's identifier read at either step 104 or 108 is used to query remotely-located data store 30 at step 110 to see if the gas cylinder is registered, i.e., has a UNIVERSAL_ID. Briefly, processor 21 passes the cylinder's identifier (e.g., RFID_NO or SERIAL_NO) to wireless interface 27 for transmission to remotely-located data store 30 that, in turn, compares the cylinder's identifier with those already stored in the data store's database. Remotely-located data store 30 provides a transmission back to device 20 to indicate if the cylinder is already registered (i.e., has a UNIVERSAL_ID) or if it is not registered. In some embodiments of the present invention, step 110 is restricted to looking at cylinders owned by the same organization authorizing use of device 20, e.g., the data in the OWNER field of the cylinder's data record structure 34 matches the owner identity associated with device 20. However, in some embodiments of the present invention that will be described below and assumed for the remainder of the description, step 110 can be configured to see if the scanned cylinder is registered in data store 30 regardless of who owns the cylinder.

If the cylinder's identifier (e.g., RFID_NO or SERIAL_NO) is registered (i.e., has a UNIVERSAL_ID) in data store 30 and there is no previously-recorded inspection failure warning (to be explained further below) associated with the identified cylinder, processor 21 causes display 22 to present the user with a number of prompts that are "cylinder inspection questions" (CIQs) at step 112. That is, as long as the cylinder's identifier is found in data store 30, the CIQs will be presented to the user of device 20 regardless of who owns the cylinder. The CIQs list a series of critical visual inspection criteria that must be answered/attested to by the user. The CIQs can be configured/customized based on a regulatory entity's requirements and, if desired, based on a customer's needs and/or policies. By way of a non-limiting illustrative example, the CIQs could include the following inspection checklist or criteria requiring a binary "YES" or "NO" response from the user:

Does the cylinder have an inoperable or damaged valve?
Does the cylinder have any damage to its body?
Are any of the cylinder's threads damaged?
Is the cylinder's locking collar damaged?

A user must respond to all CIQs on device 20 before the process will flow to its next step. In this way, the user-supplied responses can serve as a passive type of attestation to the stated inspection criteria. As will be explained further below, active user attestation can also be employed. Once all CIQs have been answered, obtained, or otherwise received at device 20, processor 21 compares (at step 114) the user-supplied responses to pre-determined acceptable responses to the CIQs where the acceptable responses are indicative of a safe gas cylinder. Processor 21 identifies if there are any discrepancies between the user-supplied responses to the CIQs and the pre-determined acceptable responses. For example, if all CIQs are constructed to have a YES or NO answer and at least one user-supplied response does not match the predetermined acceptable response, a discrepancy is identified.

In cases where one or more discrepancies are identified, device 20 generates a cylinder-fail warning indicator indicative of an unsafe gas cylinder and displays a warning message on display 22 (e.g., a "DO NOT FILL" message). Device 20 then transmits the user-supplied responses along with the cylinder-fail warning indicator for the particular cylinder to remotely-located data store 30 via wireless interface 27 at step 116 and processing ends for the particular cylinder. In this way, the historical safety data associated with the particular cylinder stored at data store 30 is updated regardless of the cylinder's ownership such that the cylinder is notated for repair or removal from service. The updated historical data is available immediately for review by the cylinder's owner/administrators having access to data store 30. Furthermore, since discrepancies between the user-supplied responses and the acceptable responses causes processing to end with step 116, subsequent processing steps are prevented. Specifically, discrepancies between the user-supplied responses and the acceptable responses prevents the display of any prompts related to the entry of gas cylinder filling data at step 118 as will be described further below.

When there are no discrepancies between the user-supplied responses to the CIQs thereby indicating that the gas cylinder is safe for filling, processing proceeds to step 117 where the owner identity of the device 20 being used is checked against the cylinder's ownership, e.g., data in the OWNER field. A match at step 117 means that the cylinder is owned by the same organization authorizing the particular device 20 being used, thereby allowing processing to proceed to step 118. If there is no owner match at step 117, the user of device 20 is asked if they would like to perform a "guest fill" at step 130. If the user opts for a guest fill, the cylinder's identifier is tagged as a "GUEST" fill for ultimate transmission to data store 30. If the user of device 20 does not want to perform a guest fill, a "DON NOT FILL" (or comparable) message is displayed at step 131 and processing ends for the cylinder.

In cases where the cylinder is owned by the same entity authorizing use of device 20 (i.e., a match occurs at step 117) or in cases where a non-owner guest fill is selected at step 130, processing proceeds to step 118 where the user is presented with prompts on display 22 identifying cylinder filling information or data that needs to be entered. By way of non-limiting examples, such cylinder filling data can include the time/date of filling, the compressor system that will be used to fill the gas cylinder, the fill pressure, the filling location, the filler's name, etc. The fill information can be presented to a user for confirmation prior to continuing.

Referring again to step 110, if a cylinder's identifier (e.g., RFID_NO or SERIAL_NO) is not registered in the remotely-located database, the user is given the option to register the cylinder at step 120. If the user elects not to register the cylinder, the user is presented with the option to perform a "guest fill" at step 121. If the user agrees to a guest fill, processing proceeds to the above-described step 112 where CIQs are presented on display 22 and the entered data to include the cylinder's serial number is tagged as a "GUEST" fill for ultimate transmission to the remotely-located database. If registration is desired, a registration interface is presented on display 22 at step 122 with user-entered information transmitted to the remotely-located data store 30. During cylinder registration, administrator 32 (FIG. 1) assigns a UNIVERSAL_ID to the cylinder and processing then proceeds to step 112. The user-entered information can include the information noted above for data record structure 34. Registration interface 122 can include instructions for a user to associate a new RFID tag with the cylinder's serial number for future identification and filling operations. If a user does not respond "YES" to either registration step 120 or a guest fill at step 121, a "DO NOT FILL" (or comparable) message is displayed at step 123 and processing ends for the cylinder.

Fill data that is entered at step 118 (i.e., for any of an owned-and-registered cylinder, a not-owned-but-registered cylinder, or a not-owned-and-not registered cylinder) is prepared for submission at step 124. For example, the present invention can prepare the user-supplied response data for cooperation with a unique "handshake" operation to insure the integrity of the data reporting and logging made possible by device 20. Briefly, the user-supplied response/fill data associated with a cylinder can be transferred to data store 30 using any secure data transfer protocol as would be well-understood in the art. Additionally or alternatively, submission preparation step 124 could include the automatic association of a permanent current-date stamp with the user-supplied response data to thereby provide confidence in the reported response data.

After the fill data is prepared for submission, device 20 (via processor 21 and wireless interface 27) monitors the availability of wireless connectivity at step 126. For example, if an internet connection is available, processor 21 issues instructions to wireless interface 27 to transmit the user-supplied response data (to include fill data) to remotely-located data store 30 at step 128. However, if no connectivity is available at step 126, processor 21 causes the response/fill data to be stored locally in memory 26 at step 129. Device 20 then continuously or periodically performs connectivity monitoring step 126 (e.g., as a background processing function) in order to automatically transmit to data store 30 (at step 128) any response/fill data stored locally at step 129. In all cases, the response/fill data is used to update the cylinder's standardized-format data record structure 34 in data store 30 which, in turn is immediately available to subsequent users.

Figure 6:
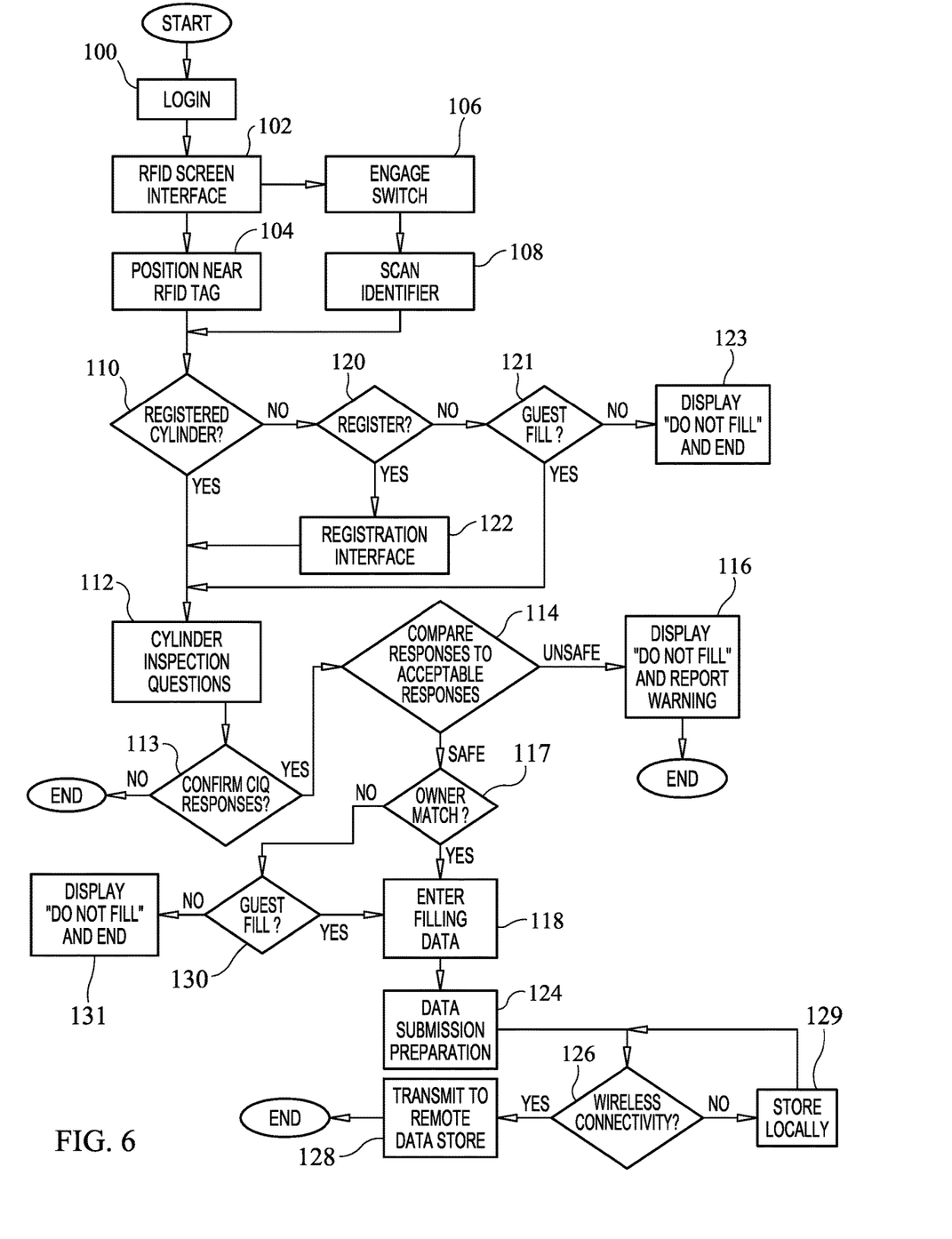
FIG. 6 is a flow diagram of a method that further requires an active form of user attestation in accordance with another embodiment of the present invention.

In some embodiments of the present invention, a fill operator could be required to actively attest to their user-supplied responses to the above-described CIQs. For example and as illustrated in FIG. 6, a user can be presented with an attestation interface at step 113 where the user must actively confirm their responses to the CIQs presented and answered in step 112. If the user confirms their responses at step 113, processing proceeds to the discrepancy check at step 114. If the user does not actively confirm their responses to the CIQs, processing ends for the particular cylinder. Such active attestation could require entry of a user's employee number, their signature, etc.

As mentioned above, it is not uncommon for cylinders belonging to multiple owners to be present at an emergency situation. It is also not uncommon for internet connectivity at such emergencies to be inconsistent or unavailable. Thus, in some embodiments of the present invention, portions of historical data for a gas cylinder owner's cylinders stored at data store 30 are used to build an offline database at device 20 when device 20 is turned on and has access to data store 30 as will now be explained with reference to FIG. 7. After device 20 is powered, has internet connectivity, and login step 100 has been successfully completed, step 101 automatically builds an offline database at local memory 26 using portions of historical data stored at data store 30 for all cylinders registered for that owner (i.e., same OWNER data). More specifically and with reference again to FIG. 2, offline database build process step 101 constructs an offline database at local memory 26 using just the critical safety and fill data from each cylinder's data record structure 34 maintained at data store 30 for that particular owner. For example, the safety and fill data for each of the owner's cylinders can include BORN, EXPIRES, STATUS, MAX_PRES, LAST_HYDRO, and NEXT_HYDRO. The offline database is constructed using the most recently updated re-fill and safety data available at data store 30 for the owner's cylinders. By limiting the offline database to just safety/fill data for the owner's cylinders, the reduced size of the offline database (as compared to the database maintained at data store 30) reduces memory needs at device 20 and reduces processing times associated with data fetches. The offline database is re-constructed or refreshed each time device 20 is logged into or if the user requests a refresh. The offline database eliminates the need for repeated access to data store 30 and is readily available for access so that a fill operator can proceed with the remainder of the process steps described herein in all situations.

Figure 7:
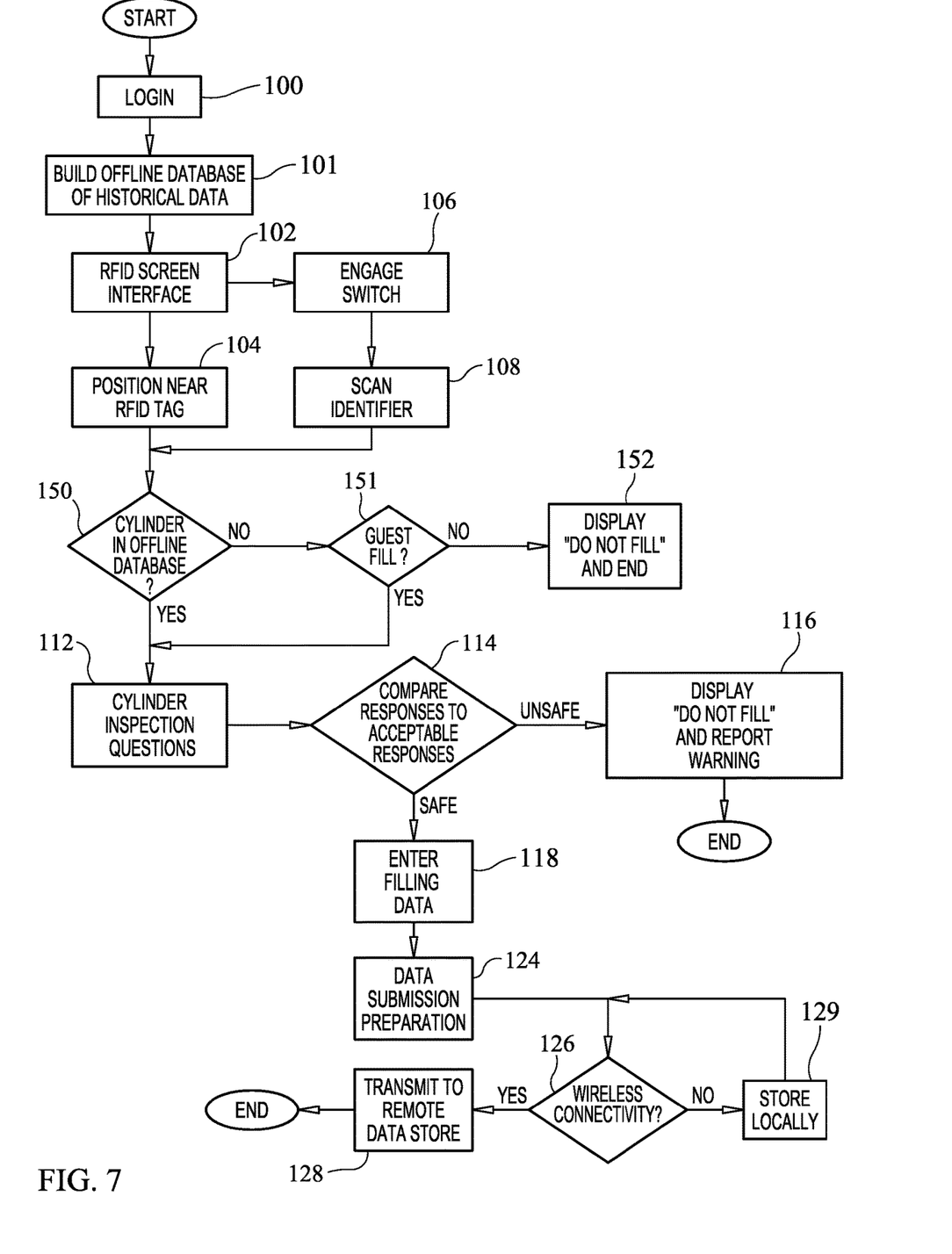
FIG. 7 is a flow diagram of a method that includes the building of an offline database of the safety-critical portions of historical data related to an owner's cylinders on a cylinder owner's mobile device in accordance with another embodiment of the present invention.

Following construction of the offline database in the local memory 26 of the device 20 being used, a read or scanned cylinder's identifier can be checked against those stored in data store 30 when there is internet connectivity as described above. However, even where there is no internet connectivity, the cylinder's identifier can still be checked against those stored in the offline database at step 150. If the cylinder's identifier (i.e., RFID_NO or SERIAL_NO) is found in the offline database, processing proceeds to step 112 and continues as described previously herein. If the cylinder's identifier is not found in the offline database, the user is presented with the option to perform a guest fill at step 151. If a guest fill is selected, processing proceeds to step 112. If the user decides not to perform a guest fill, a "DO NOT FILL" message is displayed on device 20 at step 152 and processing ends for the cylinder. For any filled cylinder (i.e., owner filled or guest fill), the fill data is processed and stored locally as described previously herein for ultimate transmission to data store 30 when internet connectivity is again available.

Figure 8:
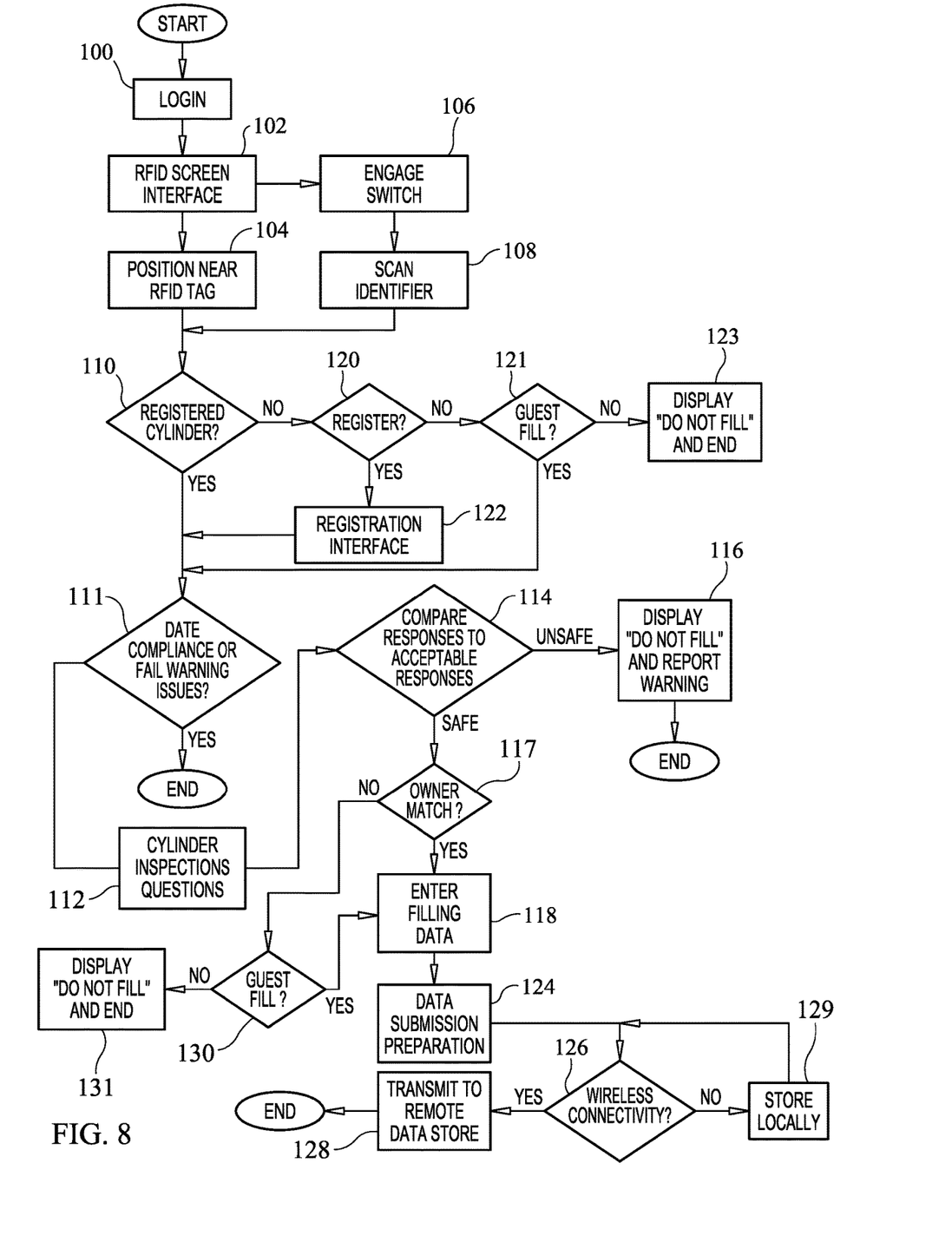
FIG. 8 is a flow diagram of a method that prevents further processing if a cylinder is out of compliance or has previously been marked as failed in accordance with another embodiment of the present invention.

In some embodiments of the present invention, a cylinder's date compliance as well as its fail warning history can be used to prevent further fill processing for a cylinder. For example and as illustrated in FIG. 8, step 111 checks the cylinder's historical data to see if the identified cylinder is past its expiration date, is overdue for its hydrostatic or other safety test, or has a previously-recorded cylinder-fail warning associated therewith owing to previous CIQ discrepancies as explained earlier herein. If the identified cylinder has any date/test compliance or fail warning issues associated therewith, step 111 causes processing to end for the particular cylinder.

Figure 9:
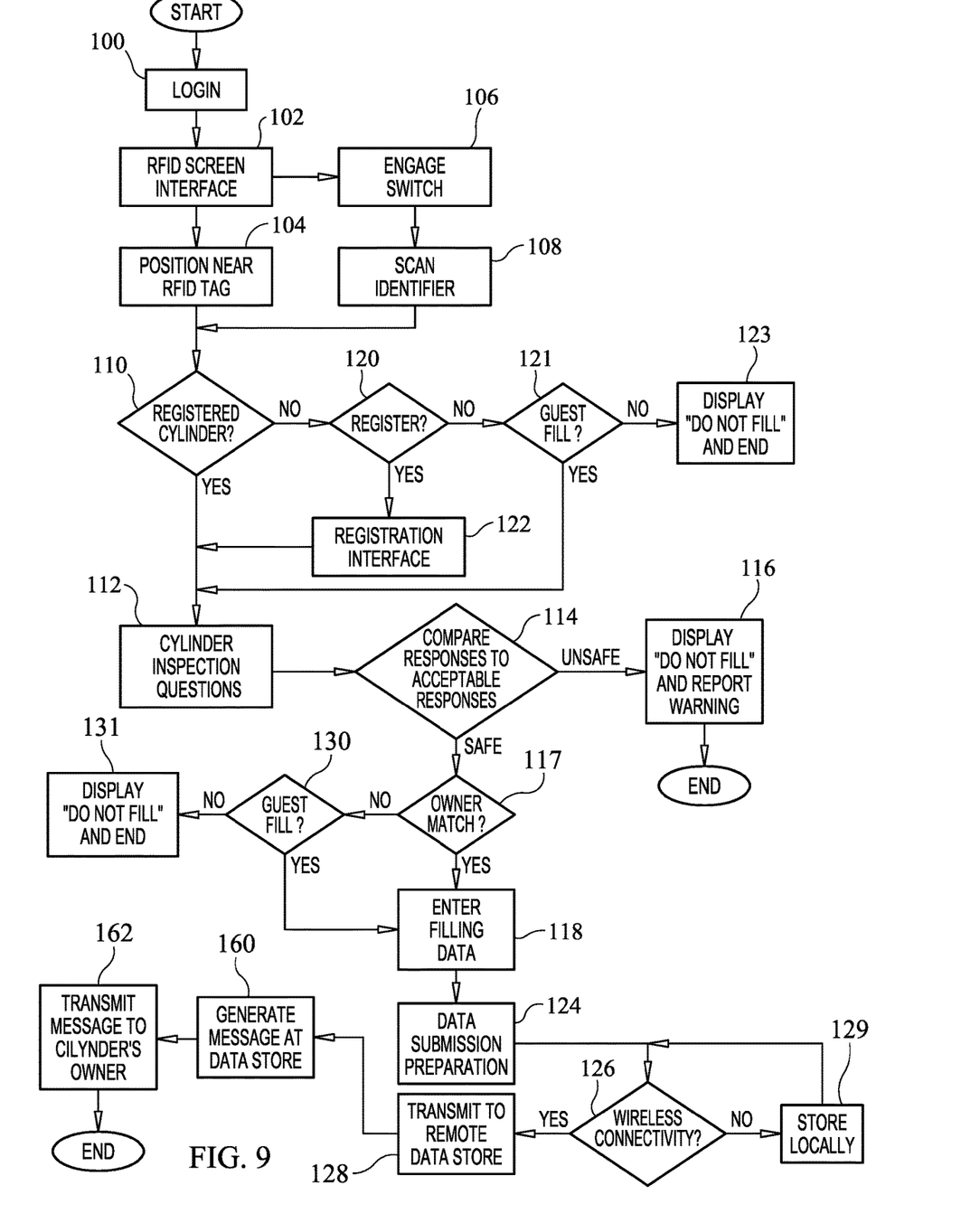
FIG. 9 is a flow diagram of a method that provides real-time message generation each time an update is made to a cylinder's record concerning its operational life in accordance with another embodiment of the present invention.

In some embodiments of the present invention, a cylinder owner is notified each time one of its owned cylinders has been re-filled by the cylinder owner's authorized user, has been re-filled as a guest fill, or has been tagged with a warning (e.g., cylinder damaged, etc.), such that the cylinder's data record structure 34 experiences an update in in data store 30. For example and as illustrated in FIG. 9, step 160 automatically generates a message that originates at data store 30 each time a registered cylinder's data record structure 34 is updated. The message (e.g., at least one of an email, text, instant message, voice message, etc.) is then sent out or transmitted at step 162 only to one or more of the cylinder-owner's personnel via, for example, the internet, cellular network(s), and/or land-based phone lines. In this way, the cylinder owner is provided with real-time knowledge that an update has been made to the operational life information for any of its cylinders regardless of who originated the information update.

It is to be understood that some or all of the features described in the embodiments illustrated in FIGS. 5-9 can be combined and incorporated into an embodiment of the present invention without departing from the scope thereof. Furthermore, while the present invention has been described for use with compressed gas cylinders, it can readily be adapted for use with other types of devices requiring routine safety inspections and maintenance. In terms of SCBA or SCUBA, such devices include, but are not limited to, air packs, back plates, and face masks.

The advantages of the present invention are numerous. The method and system simplifies and assures that operational life information for devices such as gas cylinders is current and complete regardless of a cylinder's ownership when that cylinder is re-filled. The present invention provides remotely-accessible standardized-format data records for multiple owners, as well as portions of the data records on a constructed current offline database using just the safety critical data for an owner's cylinders, thereby allowing an owner-authorized mobile device to function as designed even in the most extreme situations. Even when a "guest fill" is performed on a cylinder not owned by the fill operator's organization/entity, critical fill and safety data are ultimately updated to the comprehensive remote data store thereby preventing gaps in a cylinder's operational life history. By requiring a fill operator to manually enter and attest to critical pass/fail inspection criteria before collecting fill data, the present invention greatly reduces the chance that a faulty cylinder will be kept in service. Further, a failed cylinder has its identifier automatically recorded in a remote database to warn against its filling in the future by any operator who utilizes the present invention.

Although the invention has been described relative to specific embodiments thereof, there are numerous variations and modifications that will be readily apparent to those skilled in the art in light of the above teachings. For example, the device's touch screen could be replaced by dedicated/separate display and input devices without departing from the scope of the present invention. In other embodiments of the present invention, a registered and currently compliant cylinder's historical data could be presented on the mobile device's display following step 110 for review by the user. It is therefore to be understood that, within the scope of the appended claims, the invention may be practiced other than as specifically described.

What is claimed as new and desired to be secured by Letters Patent of the United States is:

1. A method, comprising the steps of:
   storing information for a plurality of organizations in a network-based non-transitory storage media, said information arranged in standardized-format records, each record from said standardized-format records (i) being associated with a device, (ii) being uniquely identified in said storage media, (iii) having first data matching device identification data coupled to said device, (iv) having second data indicating an owner of said device, and (v) having safety-critical data for said device;
   providing remote access to said storage media by a mobile device operated by a user authorized by one of said organizations;
   automatically constructing, when said storage media is accessible by said mobile device, an offline database on said mobile device using only said standardized-format records for said one of said organizations;
   obtaining, by said mobile device, said device identification data from a device being evaluated by the user of said mobile device;
   determining, at said storage media, if a first match exists between said device identification data for said device being evaluated and said first data in said storage media when said storage media is accessible;
   determining, at said mobile device, if a second match exists between said device identification data for said device being evaluated and said first data in said offline database when said storage media is inaccessible;
   automatically displaying, by said mobile device, a plurality of yes-no-questions related to said device being evaluated when one of said first match and said second match exists wherein, after user-supplied responses to said yes-no-questions are provided at said mobile device, a confirmation interface generated on said mobile device requests a user-supplied attestation response to be provided at said mobile device wherein said attestation response is indicative of a confirmation of said responses to said yes-no-questions;
   comparing, by said mobile device only when said attestation response is provided, said responses to said yes-no-questions with pre-determined acceptable responses, wherein a first state is identified when there are no discrepancies between said responses to said yes-no-questions and said pre-determined acceptable responses, and wherein a second state is identified when there is at least one discrepancy between said responses to said yes-no-questions and said pre-determined acceptable responses, wherein maintenance information for said device being evaluated is displayed on said mobile device only when said first state is identified, and wherein a warning is output by said mobile device only when said second state is identified;

obtaining, from the user via said mobile device, updates to said safety-critical data for said device being evaluated when one of said first match and said second match exists; and storing said updates and said responses to said yes-no-questions in said storage media for said device being evaluated when said storage media is accessible.

2. A method according to claim 1, further comprising a step of transmitting a message to the owner of said device being evaluated when said updates are stored in said storage media.

3. A method according to claim 1, further comprising the steps of:

automatically generating a message at said storage media whenever said updates are stored in said storage media for said device being evaluated; and transmitting said message from said storage media to the owner of said device being evaluated wherein the owner is advised of the occurrence of said updates.

4. A method according to claim 1, further comprising a step of automatically displaying said yes-no-questions when neither of said first match and said second match exists.

5. A method according to claim 1, further comprising a step of adding, by said mobile device, an indication of said warning to said safety-critical data for said device being evaluated wherein said warning is included in said updates stored in said storage media.

6. A method, comprising the steps of:

storing information for a plurality of organizations in a network-based non-transitory storage media, said information arranged in standardized-format records, each record from said standardized-format records (i) being associated with a device, (ii) being uniquely identified in said storage media, (iii) having first data matching device identification data coupled to said device, (iv) having second data indicating an owner of said device, and (v) having safety-critical data for said device;

providing remote access to said storage media by a mobile device operated by a user authorized by one of said organizations;

automatically constructing, when said storage media is accessible by said mobile device, an offline database on said mobile device using only said standardized-format records for said one of said organizations;

obtaining, by said mobile device, said device identification data from a device being evaluated by the user of said mobile device;

determining, at said storage media, if a first match exists between said device identification data for said device being evaluated and said first data in said storage media when said storage media is accessible;

determining, at said mobile device, if a second match exists between said device identification data for said device being evaluated and said first data in said offline database when said storage media is inaccessible;

automatically displaying, by said mobile device, a plurality of yes-no-questions related to said device being evaluated when one of said first match and said second match exists;

obtaining, by said mobile device, user-supplied responses to said yes-no-questions;

automatically generating, by said mobile device after said responses to said yes-no-questions are obtained, a confirmation interface on said mobile device requesting a user-supplied attestation response to be provided at said mobile device wherein said attestation response is indicative of a confirmation of said responses to said yes-no-questions;

comparing, by said mobile device only when said attestation response is provided, said responses to said yes-no-questions with pre-determined acceptable responses, wherein a first state is identified when there are no discrepancies between said responses to said yes-no-questions and said pre-determined acceptable responses, and wherein a second state is identified when there is at least one discrepancy between said responses to said yes-no-questions and said pre-determined acceptable responses;

automatically outputting, by said mobile device, a warning only when said second state is identified;

automatically displaying, by said mobile device, maintenance information for said device being evaluated only when said first state is identified;

obtaining, from the user via said mobile device, updates to said safety-critical data for said device being evaluated when one of said first match and said second match exists; and automatically transmitting, by said mobile device, said updates and said responses to said yes-no-questions to said storage media when said storage media is accessible.

7. A method according to claim 6, further comprising a step of automatically displaying said yes-no-questions when neither of said first match and said second match exists.

8. A method according to claim 6, further comprising a step of adding, by said mobile device, an indication of said warning to said safety-critical data for said device being evaluated wherein said warning is included in said updates transmitted to said storage media.

9. A method according to claim 6, further comprising a step of storing said responses to said yes-no-questions at said mobile device prior to said step of automatically transmitting.

10. A method, comprising the steps of:

storing information for a plurality of organizations in a network-based non-transitory storage media, said information arranged in standardized-format records, each record from said standardized-format records (i) being associated with a compressed-gas cylinder, (ii) being uniquely identified in said storage media, (iii) having first data matching cylinder identification data coupled to said cylinder, (iv) having second data indicating an owner of said cylinder, and (v) having safety-critical data for said cylinder;

providing remote access to said storage media by a mobile device operated by a user authorized by one of said organizations;

automatically constructing, when said storage media is accessible by said mobile device, an offline database on said mobile device using only said standardized-format records for said one of said organizations, said offline database including said first data and said safety-critical data for each said cylinder owned by said one of said organizations;

obtaining, by said mobile device, said cylinder identification data from a cylinder being evaluated by the user of said mobile device;

determining, at said storage media, if a first match exists between said cylinder identification data for said cylinder being evaluated and said first data in said storage media when said storage media is accessible;

determining, at said mobile device, if a second match exists between said cylinder identification data for said cylinder being evaluated and said first data in said offline database when said storage media is inaccessible;

automatically displaying, by said mobile device, a plurality of yes-no-questions related to said cylinder being evaluated when one of said first match and said second match exists;

obtaining, by said mobile device, user-supplied responses to said yes-no-questions;

automatically generating, by said mobile device after said responses to said yes-no-questions are obtained, a confirmation interface on said mobile device requesting a user-supplied attestation response to be provided at said mobile device wherein said attestation response is indicative of a confirmation of said responses to said yes-no-questions;

comparing, by said mobile device only when said attestation response is provided, said responses to said yes-no-questions with pre-determined acceptable responses, wherein a first state is identified when there are no discrepancies between said responses to said yes-no-questions and said pre-determined acceptable responses, and wherein a second state is identified when there is at least one discrepancy between said responses to said yes-no-questions and said pre-determined acceptable responses;

automatically outputting, by said mobile device, a warning only when said second state is identified;

automatically displaying, by said mobile device, cylinder filling information for said cylinder being evaluated only when said first state is identified;

obtaining, from the user via said mobile device, updates to said safety-critical data for said cylinder being evaluated when one of said first match and said second match exists; and storing said updates and said responses to said yes-no-questions in said storage media for said cylinder being evaluated when said storage media is accessible.

11. A method according to claim 10, further comprising the step of transmitting a message to the owner of said cylinder being evaluated when said updates are stored in said storage media.

12. A method according to claim 10, further comprising the steps of:
automatically generating a message at said storage media whenever said updates are stored in said storage media for said cylinder being evaluated; and
transmitting said message from said storage media to the owner of said cylinder being evaluated wherein the owner is advised of the occurrence of said updates.

13. A method according to claim 6, further comprising a step of transmitting a message to the owner of said device being evaluated when said updates are stored in said storage media.

14. A method according to claim 6, further comprising the steps of:
automatically generating a message at said storage media whenever said updates are stored in said storage media for said device being evaluated; and
transmitting said message from said storage media to the owner of said device being evaluated wherein the owner is advised of the occurrence of said updates.

15. A method according to claim 10, further comprising a step of automatically displaying said yes-no-questions when neither of said first match and said second match exists.

16. A method according to claim 10, further comprising a step of adding, by said mobile device, an indication of said warning to said safety-critical data for said cylinder being evaluated wherein said warning is included in said updates stored in said storage media.

17. A method according to claim 10, further comprising a step of storing said responses to said yes-no-questions at said mobile device prior to said step of automatically transmitting.

18. A method, comprising the steps of:
storing information for a plurality of organizations in a network-based non-transitory storage media, said information arranged in standardized-format records, each record from said standardized-format records (i) being associated with a compressed-gas cylinder, (ii) being uniquely identified in said storage media, (iii) having first data matching cylinder identification data coupled to said cylinder, (iv) having second data indicating an owner of said cylinder, and (v) having safety-critical data for said cylinder;
providing remote access to said storage media by a mobile device operated by a user authorized by one of said organizations;
automatically constructing, when said storage media is accessible by said mobile device, an offline database on said mobile device using only said standardized-format records for said one of said organizations, said offline database including said first data and said safety-critical data for each said cylinder owned by said one of said organizations;
obtaining, by said mobile device, said cylinder identification data from a cylinder being evaluated by the user of said mobile device;
determining, at said storage media, if a first match exists between said cylinder identification data for said cylinder being evaluated and said first data in said storage media when said storage media is accessible;
determining, at said mobile device, if a second match exists between said cylinder identification data for said cylinder being evaluated and said first data in said offline database when said storage media is inaccessible;
automatically displaying, by said mobile device, a plurality of yes-no-questions related to said cylinder being evaluated when one of said first match and said second match exists;
obtaining, by said mobile device, user-supplied responses to said yes-no-questions;
automatically generating, by said mobile device after said responses to said yes-no-questions are obtained, a confirmation interface on said mobile device requesting a user-supplied attestation response to be provided at said mobile device wherein said attestation response is indicative of a confirmation of said responses to said yes-no-questions;
comparing, by said mobile device only when said attestation response is provided, said responses to said yes-no-questions with pre-determined acceptable responses, wherein a first state is identified when there are no discrepancies between said responses to said yes-no-questions and said pre-determined acceptable responses, and wherein a second state is identified when there is at least one discrepancy between said responses to said yes-no-questions and said pre-determined acceptable responses;
automatically outputting, by said mobile device, a warning only when said second state is identified;

automatically displaying, by said mobile device, cylinder filling information for said cylinder being evaluated only when said first state is identified;

obtaining, from the user via said mobile device, updates to said safety-critical data for said cylinder being evaluated when one of said first match and said second match exists;

storing said updates and said responses to said yes-no-questions in said storage media for said cylinder being evaluated when said storage media is accessible; and automatically transmitting a message to the owner of said cylinder being evaluated when said updates are stored in said storage media.

19. A method according to claim 18, further comprising a step of automatically generating said message at said storage media whenever said updates are stored in said storage media for said cylinder being evaluated.

20. A method according to claim 18, further comprising a step of automatically displaying said yes-no-questions when neither of said first match and said second match exists.

21. A method according to claim 18, further comprising a step of adding, by said mobile device, an indication of said warning to said safety-critical data for said cylinder being evaluated wherein said warning is included in said updates stored in said storage media.

22. A method according to claim 18, further comprising a step of storing said responses to said yes-no-questions at said mobile device prior to said step of automatically transmitting said responses to said yes-no-questions.

* * * * *